(12) United States Patent
Vermande

(10) Patent No.: US 11,906,056 B2
(45) Date of Patent: Feb. 20, 2024

(54) ACTUATOR

(71) Applicant: Ratier-Figeac SAS, Figeac (FR)

(72) Inventor: Frédéric M. Vermande, Figeac (FR)

(73) Assignee: RATIER-FIGEAC SAS, Figeac (FR)

( * ) Notice: Subject to any disclaimer, the term of this patent is extended or adjusted under 35 U.S.C. 154(b) by 0 days.

(21) Appl. No.: 16/532,960

(22) Filed: Aug. 6, 2019

(65) Prior Publication Data

US 2020/0088218 A1 Mar. 19, 2020

(30) Foreign Application Priority Data

Sep. 14, 2018 (EP) .................................... 18306200

(51) Int. Cl.
| | |
|---|---|
| *F16K 11/07* | (2006.01) |
| *F15B 13/00* | (2006.01) |
| *F15B 15/06* | (2006.01) |
| *F15B 13/04* | (2006.01) |

(52) U.S. Cl.
CPC .............. *F16K 11/07* (2013.01); *F15B 13/00* (2013.01); *F15B 13/0402* (2013.01); *F15B 15/06* (2013.01)

(58) Field of Classification Search
CPC ........ F15B 2013/0409; F15B 2211/634; F16K 11/0716; F16K 37/0041; F16K 11/07
See application file for complete search history.

(56) References Cited

U.S. PATENT DOCUMENTS

| | | | | |
|---|---|---|---|---|
| 3,592,234 A | * | 7/1971 | Baltus .................. | F15B 13/0438 137/625.62 |
| 4,266,572 A | * | 5/1981 | Schuttenberg ...... | F15B 13/0433 137/625.63 |
| 5,546,847 A | * | 8/1996 | Rector .................. | F15B 11/048 91/464 |
| 6,283,149 B1 | | 9/2001 | Bunya et al. | |
| 8,684,037 B2 | | 4/2014 | Huynh | |
| 2002/0153045 A1 | | 10/2002 | Beyrak et al. | |

(Continued)

FOREIGN PATENT DOCUMENTS

| | | |
|---|---|---|
| EP | 1069318 A2 | 1/2001 |
| GB | 2121514 A * | 12/1983 .......... F15B 13/0402 |

OTHER PUBLICATIONS

Extended European Search Report for International Application No. 18306200.9 dated Mar. 19, 2019, 11 pages.

*Primary Examiner* — Atif H Chaudry
(74) *Attorney, Agent, or Firm* — CANTOR COLBURN LLP

(57) ABSTRACT

An apparatus for monitoring the pressurisation of a control valve for a hydraulic actuator and a control valve. The apparatus including a spool movable along an axis (X), wherein the spool is configured to control the flow of hydraulic fluid through the control valve based on its position along the axis (X), and wherein in an unpressurised state of the control valve the spool occupies a first axial position, and in a pressurised state of the control valve the spool occupies a second, different axial position. The apparatus also including a position sensor configured to monitor the position of the spool within the control valve and detect whether the spool occupies the first axial position or the second axial position, wherein the first axial position and the second axial position correspond to neutral positions of the spool.

15 Claims, 4 Drawing Sheets

(56) References Cited

U.S. PATENT DOCUMENTS

2004/0051066 A1* 3/2004 Sturman ............. F16K 31/0613
    251/129.09
2012/0090311 A1   4/2012 Le Coq et al.
2012/0199770 A1   8/2012 Alessandro
2017/0253318 A1* 9/2017 Williams ................ F16K 11/07
2018/0022440 A1* 1/2018 Joseph ................... F15B 11/08
    244/99.6
2020/0166154 A1* 5/2020 Eschenmoser ........ F16K 31/122
2020/0248830 A1* 8/2020 Schoppel ............. F16K 31/122

* cited by examiner

ACTUATOR

FOREIGN PRIORITY

This application claims priority to European Patent Application No. 18306200.9 filed Sep. 14, 2018, the entire contents of which is incorporated herein by reference.

FIELD

The present disclosure relates generally to a control valve for a hydraulic actuator, for example a horizontal stabiliser trim actuator, as well as methods of monitoring such control valves to determine characteristics of a shut-off valve operatively connected thereto.

BACKGROUND

Hydraulic actuators are known and may be configured to actuate various mechanical components. In the aerospace field hydraulic actuators are used to actuate (e.g., move) flight control surfaces such as a horizontal stabiliser. One example is a horizontal stabiliser trim actuator ("HSTA").

Most hydraulic actuators operate in a similar manner, wherein a supply of pressurised hydraulic fluid is selectively provided to a control valve, which controls the supply of the fluid to a component in order to actuate the component. A shut-off valve is typically provided that either blocks the supply of pressurised hydraulic fluid to the control valve, leaving the control valve unpressurised, or permits flow of the hydraulic fluid to the control valve, which raises the fluid pressure within the control valve. Although control valves are typically fitted with a movement sensor to monitor their position, the upstream shut-off valves are not typically fitted with any monitoring equipment.

It is desired to improve the monitoring of the hydraulic actuator and various components thereof.

SUMMARY

In accordance with an aspect of the disclosure there is provided an apparatus for monitoring the pressurisation of a control valve for a hydraulic actuator, comprising: a control valve comprising a spool movable along an axis, wherein the spool is configured to control the flow of hydraulic fluid through the control valve based on its position along the axis, and wherein in an unpressurised state of the control valve the spool occupies a first axial position, and in a pressurised state of the control valve the spool occupies a second, different axial position; and a position sensor configured to monitor the position of the spool within the control valve and detect whether the spool occupies the first axial position or the second axial position.

The above arrangement means that the position of the spool between an unpressurised (or inactive) state and a pressurised (or active) state of the control valve can be monitored.

The first axial position may correspond to a resting position of the spool when the hydraulic fluid within the control valve is not at an operating pressure or is unpressurised.

The second axial position may correspond to a resting (e.g., neutral) position of the spool when the hydraulic fluid within the control valve is at an operating pressure or is pressurised.

The control valve may further comprise: a housing within which the spool moves; a first member located at a first end of the spool and axially movable with the spool; and a first resilient member biased between the first member and a first stationary member or portion of the control valve.

In the first axial position of the spool a gap may exist between the first member and the housing, and upon pressurisation of the control valve the first member may be configured to move towards and abut the housing so as to close the gap, wherein upon contact of the first member and the housing, the gap may be closed and the spool may be in the second axial position.

The first member may comprise a radially extending surface that opposes a first radially extending surface of the housing, and the radially extending surface of the first member and the first radially extending surface of the housing may be configured to contact when the spool is in the second axial position.

The control valve may further comprise: a second member located at a second end of the spool and axially movable with the spool; and a second resilient member biased between the second member and a second stationary member or portion of the control valve.

In the first axial position of the spool the second member may be configured to contact the housing, and upon pressurisation of the control valve the second member may be configured to move away from the housing so as to create a gap between the second member and the housing when the spool is in the second axial position.

The second member may comprise a radially extending surface that opposes a second radially extending surface of the housing, and the radially extending surface of the second member and the second radially extending surface of the housing may be configured to contact when the spool is in the first axial position.

A biasing force of the first resilient member may be less than a biasing force of the second resilient member, such that when the hydraulic fluid within the control valve is not at an operating pressure or is unpressurised the biasing force of the second resilient member overcomes that of the first resilient member and forces the spool to the first axial position.

Pressurisation of the control valve may cause an additional force to be applied against the biasing force of the second resilient member, and the biasing forces of the first resilient member and the second resilient member may be configured such that the combination of the additional force and the biasing force of the first resilient member overcomes that of the second resilient member and forces the spool to the second axial position.

The apparatus may further comprise a control system configured to receive information from the position sensor relating to the axial position of the spool within the control valve and output information regarding the pressurisation of the control valve based on the information received from the position sensor.

The control system may be configured to determine the distance the spool moves as it travels from the first axial position to the second axial position, and compare the determined distance to a reference value, wherein the reference value corresponds to a normal or ideal value, and the control system is configured to output, based on the comparison, a measure of the efficiency or degradation of the system.

The control system may be configured to determine the time taken for the spool to travel from the first axial position to the second axial position, and compare the determined time to a reference value, wherein the reference value corresponds to a normal or ideal value, and the control system is configured to output, based on the comparison, a measure of the efficiency or degradation of the system.

In accordance with an aspect of the disclosure there is provided a hydraulic control system for an actuator, the system comprising an apparatus as claimed in any preceding claim, and further comprising a shut-off valve positioned upstream of the control valve and configured to selectively permit hydraulic fluid to flow into the system, wherein the shut-off valve is movable between a first position in which hydraulic fluid is not permitted to flow into the system, and a second position in which hydraulic fluid is permitted to flow into the system, and wherein the first position of the shut-off valve corresponds to an unpressurised state of the control valve, and the second position of the shut-off valve corresponds to a pressurised state of the control valve.

In accordance with an aspect of the disclosure there is provided a method of monitoring the pressurisation of a control valve for a hydraulic actuator, the control valve comprising a spool movable along an axis, the method comprising: controlling the flow of hydraulic fluid through the control valve using the spool, wherein the flow of hydraulic fluid through the control valve is based on the position of the spool along the axis, and wherein in an unpressurised state of the control valve the spool occupies a first axial position, and in a pressurised state of the control valve the spool occupies a second, different axial position; and monitoring the position of the spool within the control valve and detecting whether the spool occupies the first axial position or the second axial position.

BRIEF DESCRIPTION OF THE DRAWINGS

Various embodiments will now be described, by way of example only, and with reference to the accompanying drawings in which.

DETAILED DESCRIPTION

Herewith will be described various embodiments of a control valve for a hydraulic actuator, for example an actuator for use in an aircraft (e.g., a horizontal stabiliser trim actuator), as well as methods of monitoring such control valves to determine characteristics of a shut-off valve operatively connected thereto.

Figure 1:
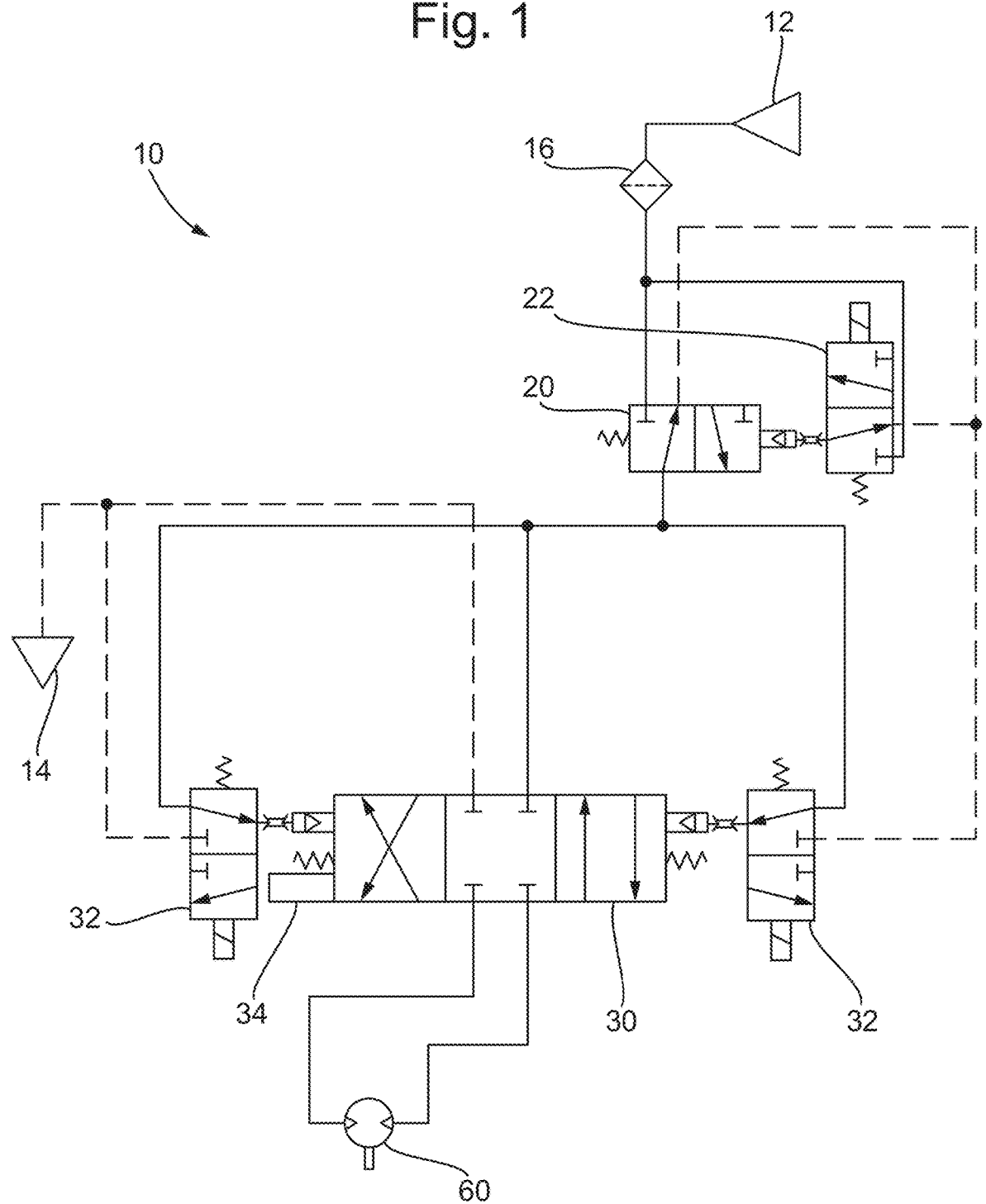
FIG. 1 shows a hydraulic control system for an actuator in accordance with an embodiment of the present disclosure.

FIG. 1 shows a hydraulic circuit diagram of a hydraulic control system 10 for an actuator in accordance with an embodiment of the disclosure.

The system 10 includes a hydraulic fluid input or supply 12 and a hydraulic fluid output or return 14. In use, hydraulic fluid enters the system at the input 12 and exits the system at the output 14. After passing through an optional filter 16 the hydraulic fluid from the input 12 flows to a shut-off valve 20, which is configured to selectively permit hydraulic fluid to flow into the system 10.

The shut-off valve 20 is shown as a "two-position" valve, wherein it moves between a first position (as shown in FIG. 1) in which hydraulic fluid is not permitted to flow from the input 12 into the system 10, and a second position in which hydraulic fluid is permitted to flow from the input 12 into the system 10. The shut-off valve 20 may be a pilot operated valve, in which a solenoid valve 22 may be configured to selectively transmit hydraulic fluid pressure to the shut-off valve 20, causing it to move from the first position to the second position.

The system 10 further comprises a control valve 30 in fluid communication with the shut-off valve 20, which is configured to control the flow of hydraulic fluid through the system 10 so as to control the actuation of a component (not shown).

The control valve 30 is shown as a "three-position" valve, wherein it is movable between a neutral position (as shown in FIG. 1) and two actuation positions indicated by the circuit symbols either side of the neutral symbol. Positioning the control valve 30 in a first of the actuation positions may move the component in a first direction, and positioning the control valve 30 in a second of the actuation positions may move the component in a second (e.g., opposite) direction.

Although a three-position control valve is shown in the illustrated embodiments, the broadest aspects of the present disclosure are not limited as such. For example, the control valve 30 could be a two-position control valve (e.g., that moves between 'closed' and 'open' positions).

The position of the control valve 30 may be controlled by resilient members located on either side of a spool 100 (as discussed in more detail below), and in addition by solenoid valves 32 (or other suitable fluid supply means) that may be configured to supply hydraulic fluid selectively to either side of the control valve 30 to move it from the neutral position shown in FIG. 1 to either of the actuation positions described. The resilient members may be springs, although suitable pneumatic or elastic devices could be used as well.

The system 10 may further comprise a position sensor 34 configured to monitor and/or determine the position of the control valve 30, that is, whether it is in the neutral position, or one of the actuation positions. In the illustrated embodiment the position sensor 34 is shown as a linear variable differential transformer ("LVDT").

The system 10 further comprises a pump or motor 60 that may be configured to pump fluid to and from the control valve 30. In the neutral position as shown in FIG. 1 the pump 60 is non-operational. When the control valve 30 moves to one of the actuation positions the pump 60 is configured to move hydraulic fluid through the system 10 so as to actuate the component.

Figure 2:
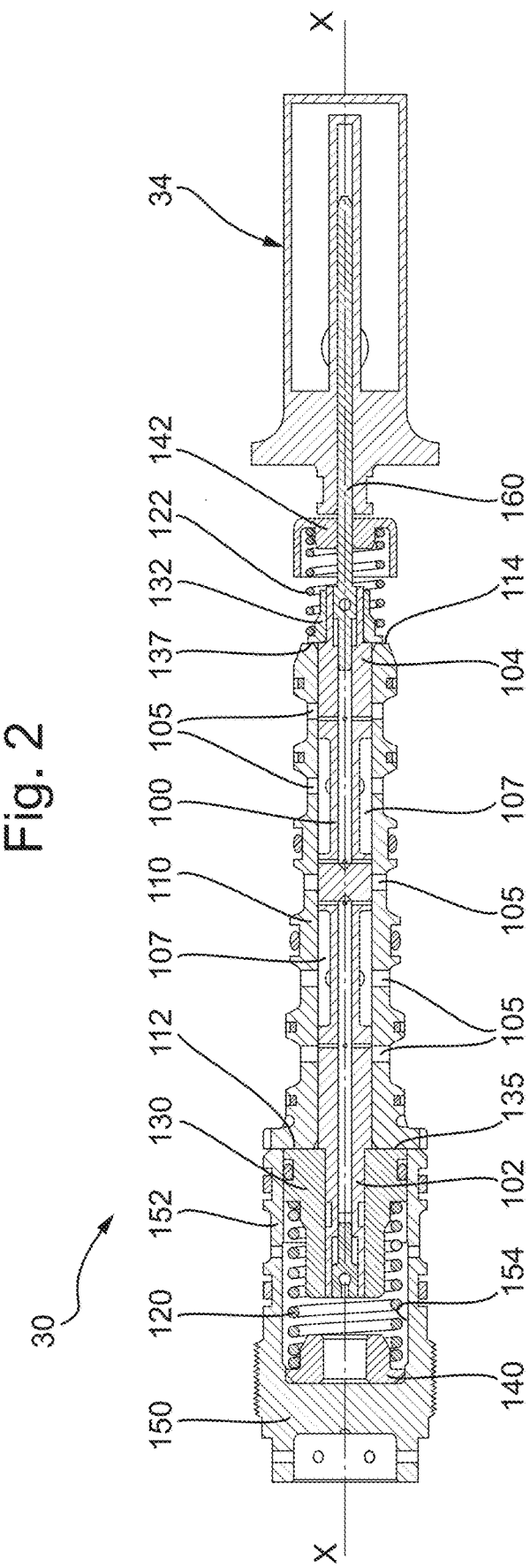
FIG. 2 shows a cross-section of a control valve for use in the hydraulic control system depicted in FIG. 1.

FIG. 2 shows a cross-section of an example control valve 30 that may be used in the system 10 of FIG. 1, as well as the position sensor 34 that is operatively connected thereto.

The control valve 30 comprises a spool 100 that is movable along an axis X and within a sleeve in the form of a generally cylindrical housing 110, wherein the spool 100 is configured to translate within the (stationary) sleeve so as to control the passage of hydraulic fluid through the control valve 30 based on its axial position within the housing 110.

The spool 100 is biased into a neutral, resting position (as shown in FIG. 2) by a first resilient member 120 that is located at a first end 102 of the spool 100, as well as a second resilient member 122 that is located at a second end 104 of the spool 100. The first resilient member 120 and the second resilient member 122 bias the spool 100 in opposing axial directions.

The control valve 30 comprises a plurality of ports 105 that are configured to permit hydraulic fluid to flow into the interior of the housing 110. The position of the spool 100 within the housing 110 determines which ports 105 the hydraulic fluid will flow to and from. In particular, the spool 100 may comprise annular cavities 107 that can be positioned axially to permit fluid to flow to and from certain ports 105. This operation is well known in the art and will not be described in detail herein.

The control valve 30 further comprises a housing portion 150 having a generally cylindrical extension 152 that defines a cylindrical surface 154 that faces radially inwards (with respect to the axis X).

The control valve 30 comprises a first movable member or piston 130 that is connected to and moves axially with the first end 102 of the spool 100. The first piston 130 may be configured to ride along the cylindrical surface 154 of the housing portion 150. The first resilient member 120 is biased between the first piston 130 and a stationary member 140, although in various embodiments may be biased against a portion of the housing portion 150.

The first piston 130 comprises a radially extending end surface 135 that faces and is configured to contact a first radially extending end surface 112 of the housing 110. Upon contact of these end surfaces 135, 112, the spool 100 is prevented from moving further in the axial direction towards the position sensor 34.

In a similar manner, the control valve 30 comprises a second movable member or piston 132 that is connected to and moves axially with the second end 104 of the spool 100. The second resilient member 122 is biased between the second piston 132 and a stationary member 142.

The second piston 132 may also comprise a radially extending surface 137 that faces and is configured to contact a second radially extending end surface 114 of the housing 110. Upon contact of these end surfaces 137, 114, the spool 100 is prevented from moving further in the axial direction away from the position sensor 34. The second radially extending end surface 114 of the housing 110 may be opposed to and abut (in use) the first radially extending end surface 135 of the housing 110.

Although the first and second movable members or pistons 130, 132 are shown as separate elements to the spool 100, in various embodiments they could be unitary with the spool 100.

A rod 160 is inserted into the second end 104 of the spool 100, and is configured to move axially with the spool 100. The rod 160 extends into the position sensor 34, which is configured to monitor the location of the rod 160 so as to determine the axial position of the spool 100 within the control valve 30.

In accordance with the disclosure, the control valve 30 is set up such that the pressurisation of the control valve 30 can be monitored using the position of the spool 100 as an indication. In order to achieve this, the resting position of the spool 100 is configured to vary slightly based on whether the control valve 30 is pressurised or not, and the position sensor 34 is configured to detect this slight variation.

Figure 3:
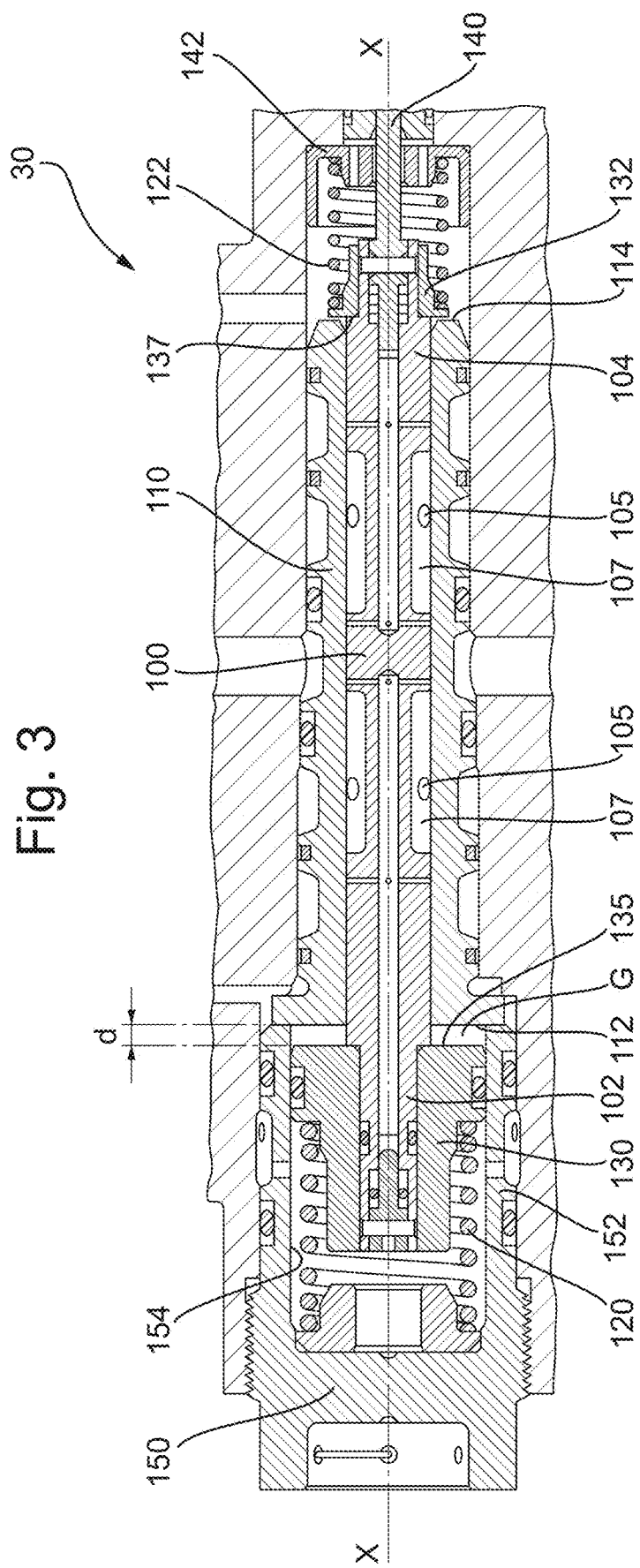
FIG. 3 shows the control valve of FIG. 2 in an unpressurised mode of operation.

FIG. 3 shows the control valve 30 wherein the spool 100 is in a resting, unpressurised position (wherein the control valve 30 is unpressurised), which corresponds to a first axial position of the spool 100. This means that the shut-off valve 20 of the system 10 may be closed (as shown in FIG. 1). The resting, unpressurised position may be referred to as a "mechanical neutral" position of the spool 100.

In the resting, unpressurised position (as shown in FIG. 3) a gap G exists between the radially extending end surface 112 of the housing 110 and the opposing first radially extending end surface 135 of the piston 130. The gap G may define a distance d between the piston 130 and the housing 110 corresponding to the distance that the piston 130 would need to move in order to contact the housing 110 and prevent further movement of the piston 130.

The gap G may be provided by configuring the strengths of the first and second resilient members 120, 122 such that the resting position in an unpressurised state means that a gap G is formed between the housing 110 and piston 130 as shown in FIG. 3. In the illustrated embodiment, movement of the spool 100 and piston 130 in the direction away from the position sensor 34 is limited by the contact of the radially extending surface 137 of the piston 132 with the second radially extending surface 114 of the housing 110.

Figure 4:
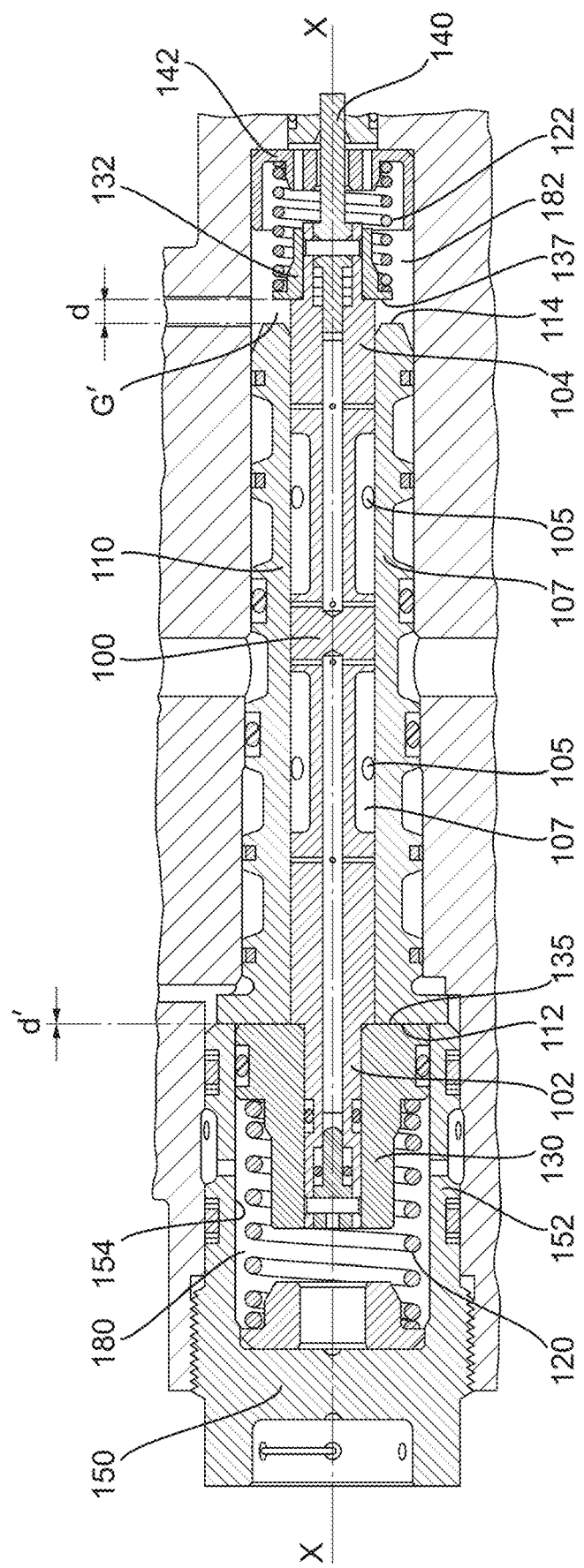
FIG. 4 shows the control valve of FIG. 2 in a pressurised mode of operation.

FIG. 4 shows the position of the components of the control valve 30 upon pressurisation thereof.

Once hydraulic fluid is permitted to enter the system 10, for example once the shut-off valve 20 is moved to an open position, hydraulic fluid will become pressurised within the system 10 and modify the resting position of the spool 100 such that it moves to a resting, pressurised position (as shown in FIG. 4), which corresponds to a second axial position of the spool 100. This may also be referred to as a neutral position of the spool 100. For example, hydraulic fluid may flow into a first chamber 180 within which the first resilient member 120 is contained, as well as a second chamber 182 within which the second resilient member 122 is contained. The resting, pressurised position may be referred to as the "hydraulic neutral" position of the spool 100.

The hydraulic fluid may shift the resting position of the spool 100 such that the first piston 130 moves in an axial direction towards the position sensor 34 and contacts the first radially extending surface 112 of the housing 110. This reduces the gap G to zero, as indicated by the distance d' indicated between the piston 130 and the housing 110 in FIG. 4.

The movement of the spool 100 also causes the second piston 132 to move axially away from the housing 110, so as to create a gap G' between the second piston 132 and the housing 110. This gap G' defines a distance d between the radially extending surface 137 of the second piston 132 and the second radially extending surface 114 of the housing 110, which is the same as the distance d indicated in FIG. 3.

It will be appreciated that the present disclosure permits the pressurisation of the control valve 30 to be monitored through the use of the position sensor 34. This may also mean that the state of the shut-off valve 20 can be determined without the use of any additional devices (e.g., sensors). In addition, the efficiency of the system 10, for example the shut-off valve 20 thereof can be monitored by measuring the amount of travel of the spool 100 between the unpressurised state and the pressurised state of the control valve 30 and the time taken for the spool 100 to travel this distance.

For example, a control system may be configured to determine the distance the spool moves as it travels from the first axial position to the second axial position, and compare the determined distance to a reference value, wherein the reference value and the control system is configured to output, based on the comparison, a measure of the efficiency or degradation of the system.

Additionally, or alternatively, the control system may be configured to determine the time taken for the spool to travel from the first axial position to the second axial position, and compare the determined time to a reference value, wherein the reference value and the control system is configured to output, based on the comparison, a measure of the efficiency or degradation of the system.

It will be appreciated that determining a distance or time as described above and comparing this to a reference (e.g., ideal) value may provide an indication of the efficiency or degradation of the system. In either case the reference value may correspond to a normal or ideal value, or could alternatively correspond to a predetermined/set value, wherein optionally a distance or time determined to be different to (e.g., below) the predetermined/set value indicates, e.g., an efficiency or degradation that is unacceptable.

Although the present disclosure has been described with reference to various embodiments, it will be understood by those skilled in the art that various changes in form and detail may be made without departing from the scope of the invention as set forth in the accompanying claims.

For example, although the position sensor 34 is shown as a linear variable differential transformer ("LVDT") any suitable position sensor may be used. In addition, and as a further example the use of a rod 160 as shown in the illustrated embodiments is not considered essential to the broadest embodiments of the present disclosure, since a non-contact (e.g., laser, magnetoresistive or Hall effect) position sensor could be used.

The invention claimed is:

1. A hydraulic control system for an actuator, the system comprising:
   a first two-position solenoid valve and a second two-position solenoid valve; and
   an apparatus for monitoring the pressurisation of a control valve for a hydraulic actuator, comprising:
      a three-position control valve movable between first actuation position, a second actuation position and a neutral position of the control valve;
      the control valve comprising a spool movable along an axis;
      wherein the spool is configured to control the flow of hydraulic fluid through the control valve based on its position along the axis so as to control the actuation of a component in a first direction when the spool is in the first actuation position and in a second direction when the spool is in the second actuation position;
      wherein the neutral position of the control valve comprises a mechanical neutral position of the spool along the axis and a hydraulic neutral position of the spool along the axis;
      wherein in an unpressurised state of the control valve the spool occupies the mechanical neutral position and in a pressurised state of the control valve the spool occupies the hydraulic neutral position; and
      a position sensor configured to monitor the position of the spool within the control valve and detect whether the spool occupies the mechanical neutral or the hydraulic neutral position;
   wherein the first two-position solenoid valve and the second two-position solenoid valve are configured to supply hydraulic fluid selectively to the control valve to move the spool from the hydraulic neutral position to one of the first actuation position or the second actuation position.

2. A system as claimed in claim 1, wherein the mechanical neutral position corresponds to a resting position of the spool when the hydraulic fluid within the control valve is not at an operating pressure or is unpressurised.

3. A system as claimed in claim 2, wherein the hydraulic neutral position corresponds to a resting position of the spool when the hydraulic fluid within the control valve is at an operating pressure or is pressurised.

4. A system as claimed in claim 1, wherein the control valve further comprises:
   a housing within which the spool moves;
   a first member located at a first end of the spool and axially movable with the spool; and
   a first resilient member biased between the first member and a first stationary member or portion of the control valve,
   wherein in the mechanical neutral position of the spool a gap (G) exists between the first member and the housing, and upon pressurisation of the control valve the first member is configured to move towards and abut the housing so as to close the gap (G), wherein upon contact of the first member and the housing the gap (G) is closed and the spool is in the hydraulic neutral position.

5. A system as claimed in claim 4, wherein the first member comprises a radially extending surface that opposes a first radially extending surface of the housing, and the radially extending surface of the first member and the first radially extending surface of the housing are configured to contact when the spool is in the hydraulic neutral position.

6. A system as claimed in claim 4, wherein the control valve further comprises:
   a second member located at a second end of the spool and axially movable with the spool; and
   a second resilient member biased between the second member and a second stationary member or portion of the control valve,
   wherein in the mechanical neutral position of the spool the second member is configured to contact the housing, and upon pressurisation of the control valve the second member is configured to move away from the housing so as to create a gap (G') between the second member and the housing when the spool is in the hydraulic neutral position.

7. A system as claimed in claim 6, wherein the second member comprises a radially extending surface that opposes a second radially extending surface of the housing, and the radially extending surface of the second member and the second radially extending surface of the housing are configured to contact when the spool is in the mechanical neutral position.

8. A system as claimed in claim 6, wherein a biasing force of the first resilient member is less than a biasing force of the second resilient member, such that when the hydraulic fluid within the control valve is not at an operating pressure or is unpressurised the biasing force of the second resilient member overcomes that of the first resilient member and forces the spool to the mechanical neutral position.

9. A system as claimed in claim 8, wherein pressurisation of the control valve causes an additional force to be applied against the biasing force of the second resilient member, and the biasing forces of the first resilient member and the second resilient member are configured such that the combination of the additional force and the biasing force of the first resilient member overcomes that of the second resilient member and forces the spool to the hydraulic neutral position.

10. A system as claimed in claim 1, further comprising a control system configured to receive information from the position sensor relating to the axial position of the spool within the control valve and output information regarding the pressurisation of the control valve based on the information received from the position sensor.

11. A system as claimed in claim 10, wherein the control system is configured to determine the distance the spool moves as it travels from the mechanical neutral position to the hydraulic neutral position, and compare the determined distance to a reference value, and the control system is configured to output, based on the comparison, a measure of the efficiency or degradation of the system.

12. A system as claimed in claim 10, wherein the control system is configured to determine the time taken for the spool to travel from the mechanical neutral position to the hydraulic neutral position, and compare the determined time to a reference value, and the control system is configured to output, based on the comparison, a measure of the efficiency or degradation of the system.

13. A system as claimed in claim 1, the system comprising:
a shut-off valve positioned upstream of the control valve;
wherein the shut off valve is configured to selectively permit hydraulic fluid to flow into the system, wherein the shut-off valve is movable between a first position in which hydraulic fluid is not permitted to flow into the system, and a second position in which hydraulic fluid is permitted to flow into the system;
wherein the first position of the shut-off valve corresponds to an unpressurised state of the control valve, and the second position of the shut-off valve corresponds to a pressurised state of the control valve.

14. A method of monitoring the pressurisation of a control valve for a hydraulic actuator, the control valve being movable between a neutral position, first actuation position and a second actuation position, the control valve comprising a spool movable along an axis (X), wherein the neutral position of the control valve comprises a mechanical neutral position and a hydraulic neutral position of the spool along the axis;
the method comprising:
controlling the flow of hydraulic fluid through the control valve using the spool so as to control the actuation of a component in a first direction when the spool is in the first actuation position and in a second direction when the spool is in the second actuation position, wherein the flow of hydraulic fluid through the control valve is based on the position of the spool along the axis (X), and wherein in an unpressurised state of the control valve the spool occupies the mechanical neutral position, in a pressurised state of the control valve the spool occupies the hydraulic neutral position and wherein a first two- position solenoid valve and a second two-position solenoid valve are configured to supply hydraulic fluid selectively to the control valve to move the pool from the hydraulic neutral position to one of the first actuation position or the second actuation position;
monitoring the position of the spool within the control valve and detecting whether the spool occupies the mechanical neutral position or the hydraulic neutral position.

15. A hydraulic control system for an actuator, the system comprising:
a first two-position solenoid valve and a second two-position solenoid valve; and
an apparatus for monitoring the pressurisation of a control valve for a hydraulic actuator, comprising:
a three-position control valve comprising a spool movable along an axis between a first axial position and a second axial position, wherein the spool is configured to control the flow of hydraulic fluid through the control valve based on its position along the axis so as to control the actuation of a component in a first direction when the spool is in a first actuation position, the first actuation position being a first position of the three-position control valve, and in a second direction when the spool is in a second actuation position, the second actuation position being a second position of the three-position control valve; and
a position sensor configured to detect a slight variation in a neutral, resting position of the spool, the neutral, resting position of the spool being a third position of the three-position control valve,
wherein in an unpressurised state of the control valve the neutral, resting position of the spool corresponds to the first axial position, and in a pressurised state of the control valve the neutral, resting position is modified such that it moves to the second axial position; and
wherein the first two-position solenoid valve and the second two-position solenoid valve are configured to supply hydraulic fluid selectively to the control valve to move the spool from the second axial position to one of the first actuation position or the second actuation position.

* * * * *